(12) United States Patent
Asama et al.

(10) Patent No.: US 6,453,212 B1
(45) Date of Patent: Sep. 17, 2002

(54) METHOD FOR MOBILE ROBOT MOTION CONTROL

(75) Inventors: Hajime Asama; Hayoto Kaetsu, both of Saitama; Kuniaki Kawabata, Tokyo; Kazuhiro Kosuge; Yasuhisa Hirata, both of Miyagi, all of (JP)

(73) Assignee: Riken, Saitama (JP)

( * ) Notice: Subject to any disclaimer, the term of this patent is extended or adjusted under 35 U.S.C. 154(b) by 0 days.

(21) Appl. No.: 09/657,084

(22) Filed: Sep. 7, 2000

(30) Foreign Application Priority Data

Mar. 8, 2000 (JP) .......................... 2000-064209

(51) Int. Cl.[7] .............................. B06F 19/00
(52) U.S. Cl. .................... 700/245; 701/23; 701/25; 701/28; 701/217; 701/300; 701/301; 318/587; 382/153; 901/1
(58) Field of Search ............................ 700/245; 701/23, 701/25, 28, 205, 217, 300, 301; 318/587; 382/153; 901/1

(56) References Cited

U.S. PATENT DOCUMENTS 4,432,425 A * 2/1984 Nitzberg ...................... 206/354

OTHER PUBLICATIONS

Hashimoto et al., Path tracking control of a non–holonomic modular omnidirectional vehicle, 1999, IEEE, pp. VI–637–VI–642.*

Kosuge et al., Transportation of a single object by multiple decentralized–controlled nonholonomic mobile robots, 1999, IEEE, pp. 1681–1686.*

Wada et al., Modeling and control of a New Type of Omnidirectional Holonomic Vehicle, 1996, IEEE, pp. 265–270.*

Ozdalyan et al. Comparison of suspension rog measurements, 1998, Internet/IEEE, pp. 133–139.*

Peshkin et al. Cobots, 1999, Internet, pp. 335–341.*

Peshkin et al., Cobot architecture, Internet/IEEE, pp. 377–390.*

Kosuge, K., et al., Transportation of a Single Object by Two Decentralized–Controlled Nonholonomic Mobile Robots, Proceedings of the 1998 IEEE International Conference on Robotics & Automation, May 1998, pp. 2989–2994.

* cited by examiner

Primary Examiner—William A. Cuchlinski
Assistant Examiner—McDievnel Marc (57) ABSTRACT

In a method for mobile robot motion control for the sake of controlling motional characteristics of the mobile robot, such motional characteristics of mobile robot are made to be virtually equivalent motional characteristics of a caster, whereby motional performance adaptable to an external force is realized. Thus, a method for mobile robot motion control by which an object can be cooperatively manipulated by human being and mobile robot is provided.

8 Claims, 5 Drawing Sheets

FIG. 4 (a)
x axis

FIG. 4 (b)
y axis

FIG. 4 (c)
rotation

FIG. 5 (a)
x axis

FIG. 5 (b)
y axis

FIG. 5 (c)
rotation

METHOD FOR MOBILE ROBOT MOTION CONTROL

BACKGROUND OF THE INVENTION

1. Field of the Invention

The present invention relates to a method for mobile robot motion control, and more particularly to a method for mobile robot motion control suitably used for controlling movements in the robot in the case where a human being (operator) and the robot manipulate a single object in cooperation with each other.

2. Description of the Related Art

In general, robots have been developed in a fashion wherein they assist working which have been performed heretofore by human workers in large-scale facilities, and industrial plants such as principally chemical plants, nuclear power plants, or a variety of outdoor or indoor job sites.

In this respect, it has been presupposed that workers do not go into a job site where robots operate during their working in view of safety. Based on such presupposition, a variety of robots are constituted.

On one hand, it is expected to apply robot for new fields such as medical and welfare job sites or domestic service, because of developments of robot technology in recent years. In such medical and welfare job sites or home and the like, it is considered that there are many scenes where human being and robot coexist and act together in the same working space, and human being works in cooperation with robot.

In these circumstances, when it is intended to fix up robot for use in a factory and the like, no mobile mechanism or the like is required for such robot. In the other cases, however, i.e., the cases where robot is used in medical and welfare job sites or home and the like as described above, it is indispensable to prepare a mobile mechanism by which robot can freely move in such sites.

In this respect, when it is considered to use robot in medical and welfare job sites or home and the like, it becomes a problem to provide such mobile mechanism as described above on a considerably large robot in view of safety. Accordingly, it has been needed that such mobile mechanism as described above is applied to a comparatively small-sized robot, and such a robot who can move in a space where the robot itself presents (a robot provided with a mobile mechanism by which the robot can move freely in a specified space where the robot itself presents is herein referred optionally to as "mobile robot") is cooperatively utilized with respect to human being, whereby human being and robot can work in cooperation with each other.

OBJECTS AND SUMMARY OF THE INVENTION

The present invention has been made in view of the need as described above, and an object of the invention is to provide a method for controlling movements in a mobile robot which can manipulate an object in cooperation with human being.

In order to achieve the above described object, a method for mobile robot motion control according to the present invention is constituted in such that a load in its gravitational direction is compensated totally by a mobile robot with holding an object thereby, while a human being gives a motion command with respect to the mobile robot to travel the same in a desired orientation, whereby the object is manipulated. It is very effective to control motion of mobile robot by human being's motion command.

It is studied herein a case where a human being works cooperatively with a mobile robot, the following two tasks must be carried out in the case where a single object is manipulated by the human being in cooperation with the mobile robot.

One of the tasks is a positioning task wherein a position and a posture of the object are determined correctly and arranged suitably, and another task is a conveying task for conveying the single object to a certain target point.

In the positioning task, it is preferred to be capable of controlling the mobile robot in such that the object is moved on the basis of a force applied to the object by the human being and its orientation decided by the human being, while it is preferred in the conveying task to be capable of controlling the mobile robot in such that the object is moved in only the travel orientation thereof decided. According to such arrangement as described above, the object can be manipulated while reducing a burden of the human being.

According to the present invention, a method for controlling mobile robot by which it becomes possible to conduct the above described positioning task and conveying task in the mobile robot is realized.

Namely, a method for mobile robot motion control according to the present invention provides a manner for controlling mobile robot in a control system for manipulating a single object by a human being in cooperation with mobile robot.

More specifically, the present invention provides a manner wherein a manipulating task for a single object is classified into two tasks of a positioning task and a conveying task, and characteristics of a caster is given to the mobile robot in order to reduce human being's burden in these two tasks.

In the section "Detailed Description of The Preferred Embodiment" which is mentioned hereinafter, experimental results in the case where a manner of the method for mobile robot motion control according to the present invention is applied to an omnidirectionally mobile robot, whereby the mobile robot manipulates a single object in cooperation with a human being are shown, and as a result, it has been found that effectiveness of the present invention becomes clear.

Accordingly, the subject invention relates to a method for mobile robot motion control for the sake of controlling motional characteristics of the mobile robot, characterized by that the motional characteristics of the mobile robot are made to be virtually equivalent to motional characteristics of a caster, whereby motional performance adaptable to an external force is realized.

Furthermore, the subject invention relates to a method for mobile robot motion control for the sake of controlling motional characteristics of the mobile robot, characterized by that characteristic parameters of a caster are dynamically changed in control for mobile robot to which have been virtually applied equivalent motional characteristics of the caster, whereby motional characteristics of the mobile robot are appropriately changed.

Thus, according to the subject inventions, a cooperative manipulation of a single object by which a burden share of human being is reduced can be realized.

Moreover, the subject invention relates to a method for mobile robot motion control for the sake of controlling motional characteristics of the mobile robot, characterized by that a control parameter $r_i$ is made to be small in the case where a speed of a mobile robot in its travel orientation is low, while the control parameter $r_i$ is made to be large in the case where the speed of the mobile robot in the travel orientation is high; and the control parameter $r_i$ is an offset defined between a moving center of the mobile robot and a holding point at which the robot holds an object.

Furthermore, the subject invention relates to a method for mobile robot motion control for the sake of controlling motional characteristics of the mobile robot, characterized by that a control parameter $^{tran}D_i$ is made to be large in the case where a speed of a mobile robot in its travel orientation is low, while the control parameter $^{tran}D_i$ is made to be small in the case where the speed of the mobile robot in the travel orientation is high; and the control parameter $^{tran}D_i$ corresponds to the origin of a robot coordinate system $'\Sigma_i$ fixed to a holding point of the mobile robot, at the same time, it is allowed to coincide a $^c x_i$-axis of a caster coordinate system $^c\Sigma_i$ rotatable freely around the origin with its travel orientation of the mobile robot, and it corresponds to a positive damping coefficient in the case where the mobile robot is subjected to damping control based on a force $^c f_{xi}$ acting in the $^c x_i$-axial direction.

Moreover, the subject invention relates to a method for mobile robot motion control for the sake of controlling motional characteristics of the mobile robot, characterized by that a control parameter $^{rot}D_i$ is made to be small in the case where a speed of a mobile robot in its travel orientation is low, while the control parameter $^{rot}D_i$ is made to be large in the case where the speed of the mobile robot in the travel orientation is high; and the control parameter $^{rot}D_i$ is a positive damping coefficient in the case where the mobile robot is subjected to damping control by a moment acting upon the mobile robot.

Furthermore, the subject invention relates to a method for mobile robot motion control for the sake of controlling motional characteristics of the mobile robot, characterized by that a control parameter $r_i$ is made to be small, a control parameter $^{tran}D_i$ is made to be large, and a control parameter $^{rot}D_i$ is made to be small in the case where a speed of a mobile robot in its travel orientation is low, while the control parameter $r_i$ is made to be large, a control parameter $^{tran}D_i$ is made to be small, and a control parameter $^{rot}D_i$ is made to be large in the case where the speed of the mobile robot in the travel orientation is high; the control parameter $r_i$ is an offset defined between a moving center of the mobile robot and a holding point at which the robot holds an object; the control parameter $^{tran}D_i$ corresponds to the origin of a robot coordinate system $'\Sigma_i$ fixed to a holding point of the mobile robot, at the same time, it is allowed to coincide a $^c x_i$-axis of a caster coordinate system $^c\Sigma_i$ rotatable freely around the origin with its travel orientation of the mobile robot, and it corresponds to a positive damping coefficient in the case where the mobile robot is subjected to damping control based on a force $^c f_i$ acting in the $^c x_i$-axial direction; and the control parameter $^{rot}D_i$ is a positive damping coefficient in the case where the mobile robot is subjected to damping control by a moment acting upon the mobile robot.

It is to be noted herein that motional characteristics of a mobile robot change dependent upon the control parameter $r_i$, the control parameter $^{tran}D_i$, and the control parameter $^{rot}D_i$, respectively.

Therefore, when the parameter $r_i$, the parameter $^{tran}D_i$, and the parameter $^{rot}D_i$ are determined on the basis of the travel speed of a mobile robot as in the subject inventions, a cooperative manipulation of a single object by which a human being's burden share is reduced can be realized.

Moreover, the subject invention relates to a computer-readable storage media, characterized by that a program for executing a method for mobile robot motion control as mentioned above by a computer is recorded therein.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENT

An embodiment of a method for controlling movements in a mobile robot according to the present invention will be described in detail hereinafter in conjunction with the accompanying drawings.

It is to be noted that in the following description, a case where an object is firmly held by each of the number n (n: positive integer) of distributively controlled holonomic mobile robots, and such a single object is operated by applying a force thereon by a human being (operator) will be explained.

First, there is a damping control method as a manner for realizing a manipulation of a single object in accordance with cooperation between human being and mobile robot.

In the damping control, speed is controlled in such that respective mobile robots are moved in any orientation in accordance with an instructed speed, and a mobile robot is controlled by employing force information from a force sensing sensor loaded with each robot so as to satisfy characteristics of equation (1):

$$D_i \dot{x}_i = F_i \qquad (1)$$

wherein suffix i represents the i-th mobile robot, an expression $D_i \in R^{3 \times 3}$ means a positively definite damping coefficient matrix;

an expression $F_i \in R^3$ represents force/moment acts upon each mobile robot, and an expression $\dot{x}_i \in R^3$ represents a real speed in a mobile robot.

In this case, when it is supposed that a mobile robot holds firmly an object, and there is no relative movement between the mobile robot and the object, it becomes possible to manipulate the object in an arbitrary orientation, if the human being apply a force onto the object.

Meanwhile, in a control system according to such damping control, motion is controlled on the basis of a magnitude of force acts upon an object as well as of an orientation in force acting on the object.

Accordingly, although damping control is suitable for use in case of positioning task of an object, there is such a tendency of increasing human being's responsibility in a conveying task where a distance to be moved is lengthy.

More specifically, in case of conducting a conveying task of an object, an orientation along which a force is applied by a human being must be always in parallel to the travel orientation, but it is considered that a deviation arises between the travel orientation and an orientation of movement with taking errors in a force sensing sensor as well as human being's characteristics into consideration. In this connection, all the tasks for correcting such deviation in motion must be made by a human being, so that a burden share to be owed to human being becomes significant.

Figure 1A:
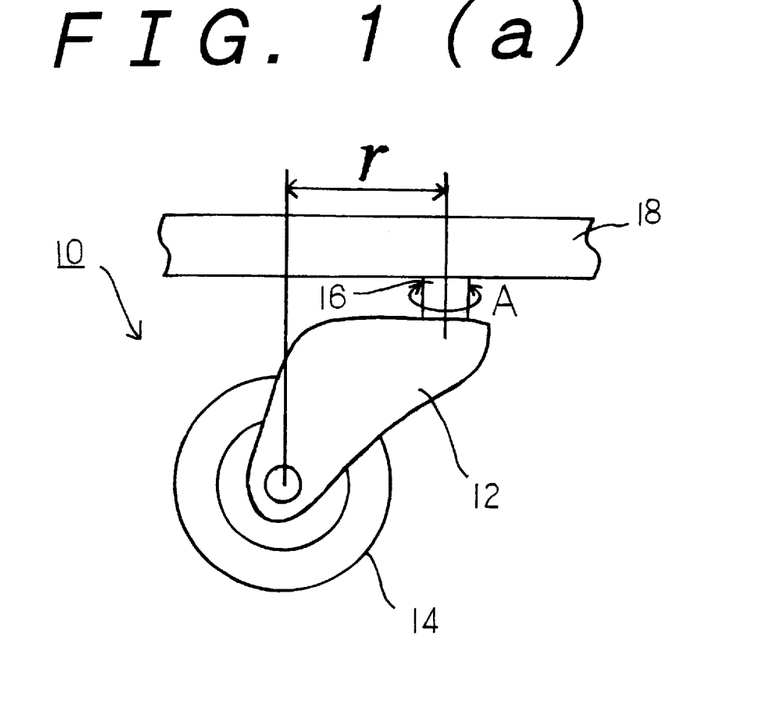
FIG. 1(a) is a front view showing a caster.
Figure 1B:
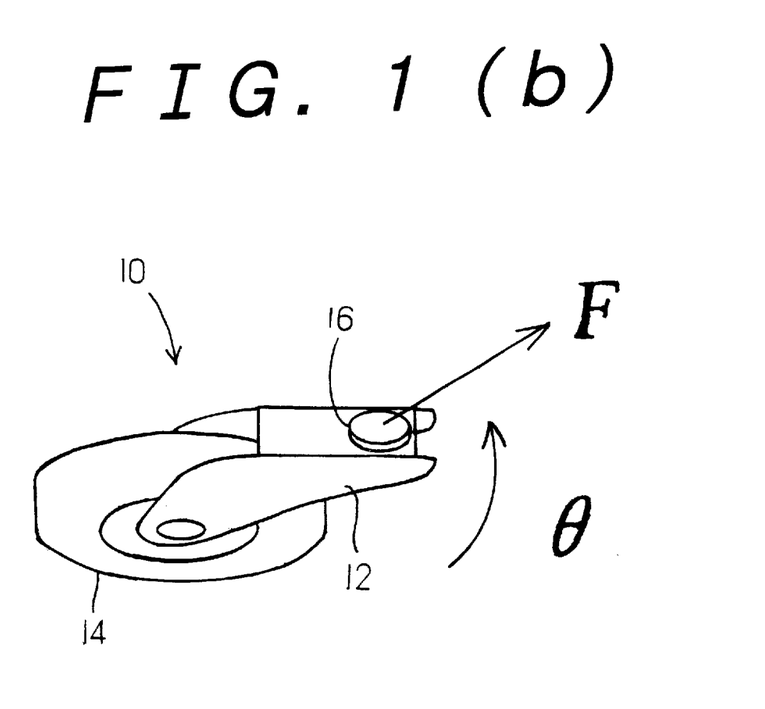
FIG. 1(b) is a perspective view showing the caster of FIG. 1(a)

For this reason, in a method for controlling movements in a mobile robot according to the present invention, for the sake of reducing human being's burden share in case of conducting a conveying task, it is arranged to combine a manner for controlling a mobile robot so as to perform equivalent motion to that of a caster as shown in FIGS. 1(a) and 1(b), in other words, a manner for controlling virtually motional characteristics of a mobile robot into equivalent motional characteristics of a caster ("manner for controlling virtually motional characteristics of a mobile robot into equivalent motional characteristics of a caster" referred herein to as "caster action") with the above described damping control.

In FIGS. 1(a) and 1(b), a caster 10 is provided with a wheel 14 fitted rotatably to a supporting member 12, and a free joint 16 is disposed on the supporting member 12 and which is fitted to an object to be mounted 18 such as a chair through the free joint 16.

Thus, the caster 10 is rotatable around the axis of the free joint 16 with respect to the mounting object 18 as shown by the arrow A in FIG. 1(a).

Caster action will be described hereinafter. First, a case where the mounting object 18 such as a chair provided with the caster 10 is moved by a human being is studied. In this case, when a force, i.e., an external force is applied by a human being to the mounting object 18, the wheel 14 rolls on a floor in response to the force applied, and at the same time the caster 10 mounted on the mounting object 18 rotates around the axis of the free joint 16 towards the orientation corresponding to that to which was applied the force by the human being, whereby the mounting object 18 can be moved in a desired orientation.

Furthermore, during such running of the caster 10, even if an orientation of the caster 10 is deviated from the travel orientation due to a slight step and the like, the caster 10 rotates around the axis of the free joint 16, so that the orientation is corrected in the course of nature into that to which the force directs.

In this case, a rotational speed of the caster 10 is determined by an offset r of the caster 10 shown in FIG. 1(a), and motional characteristics are determined thereby in case of applying a force to the mounting object 18.

In this respect, since the caster 10 mounted to the mounting object 18 such as chair has a constant offset value r, motional characteristics of the mounting object 18 are invariable. However, when a value r of the offset is allowed to arbitrarily change, it is possible to arbitrarily change the motional characteristics thereof.

In the present invention, motional characteristics of a mobile robot is made to be virtually equivalent motional characteristics of a caster by utilizing such characteristics of the caster, whereby motional performance of a mobile robot well adapted to external force is realized, and as a result, a manipulation of a single object by human being in cooperation with robot is achieved.

In the following, a control system for respective mobile robots will be studied, and in this case, it is to be noted that a caster mounted to the mounting object 18 such as chair, in general, is connected to the mounting object through a free joint as shown in FIG. 1(a).

In this case, however, when a free joint is used as a point of holding an object in each mobile robot, a weight capacity of each mobile robot must be decreased because the free joint is difficult to withstand high load, it is not so desirable.

Under the circumstances, explanation will be made upon a manipulation of a single object in a condition where the object is firmly held by each mobile robot, and there is no relative movement between the object and each mobile robot.

Namely, when each robot holds an object through no free joint, a force and a moment are produced in a translation orientation in each mobile robot. Accordingly, in a method for mobile robot motion control according to the present invention, control in accordance with caster action is made on a translation force acting upon each mobile robot so as to simulate movements in caster, while damping control producing a rotational speed of a mobile robot in response to its magnitude is applied to a moment acting upon each mobile robot.

First, control according to caster action is made so as to simulate movements in a caster in response to a force in translation orientation applied to each mobile robot.

Figure 2:
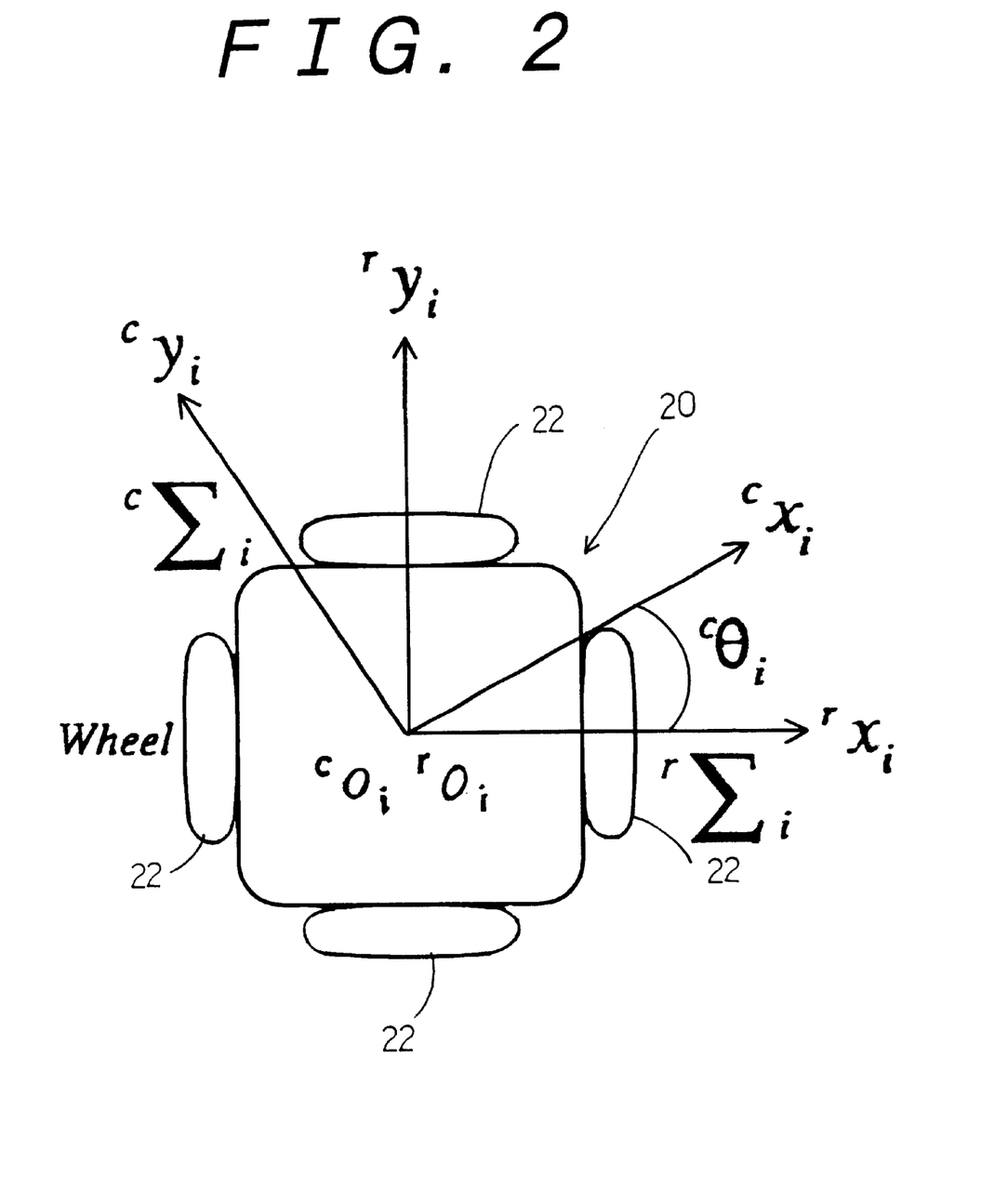
FIG. 2 is an explanatory diagram showing a coordinate system of a mobile robot.

A coordinate system $'\Sigma_i$ and another coordinate system $^c\Sigma_i$ in an i-th mobile robot 20 being an omnidirectional mobile robot which is provided with four wheels 22, 22, 22, and 22 for an omnidirectional moving vehicle to be capable of moving in any orientation are defined wherein the coordinate system $'\Sigma_i$ means a robot coordinate system fixed to a point of holding an object in each mobile robot, and it moves together with the mobile robot 20, while the coordinate system $^c\Sigma_i$ corresponds to the origin of the robot system, and it is a caster coordinate system which can freely rotates around the origin. In this case, a turning angle derived from the robot coordinate system and the caster coordinate system is defined as $^c\theta_i$.

First, a $^cX_i$-axis in the caster coordinate system is adapted to correspond to a travel orientation of a mobile robot, and each mobile robot is subjected to damping control on the basis of a force $^cf_{xi}$ acting in the axial direction so as to satisfy characteristics represented by an equation (2):

$$^{tran}D_i \, ^c\dot{x}_i = \, ^cf_{xi} \qquad (2)$$
$$= (^rf_{xi} - \, ^rf_{xi}^{in})\cos \, ^c\theta_i + (^rf_{yi} - \, ^rf_{yi}^{in})\sin \, ^c\theta_i$$

wherein $^{tran}D_i \in R$ indicates a positive damping coefficient, $^c\dot{x}_i \in R$ represents a real speed of a mobile robot in the $^cX_i$-axial direction in the caster coordinate system, $^rf_{xi}, ^rf_{yi} \in R$ is a force acting upon a mobile robot represented by the robot coordinate system; and $^rf_{xi}^{in}, ^rf_{yi}^{in} \in R$ is a target value of an internal force to be applied to an object by a mobile robot.

When the target value of an internal force to be applied to an object by a mobile robot is suitably specified, it becomes possible that each mobile robot can keep the object by the internal force.

Then, in order that a mobile robot simulates movements in a caster, a rotational speed of a coordinate system is determined by an equation (3):

$$^{cast}D_i{}^c\dot{\theta}_i = \frac{1}{r_i}{}^c f_{yi} \qquad (3)$$

$$= \frac{1}{r_i}\{-({}^r f_{xi} - {}^r f_{xi}^{in})\sin{}^c\theta_i + ({}^r f_{yi} - {}^r f_{yi}^{in})\cos{}^c\theta_i\}$$

wherein $^{cast}D_i \in R$ represents a positive damping coefficient, and $r_i$ represents an offset of the caster defined between an axle shaft as shown in FIGS. 1(a) and 1(b) and a point of holding an object, i.e., an offset defined between a moving center of the mobile robot and a holding point at which the mobile robot holds the object, and in other words, a distance defined between the moving center of the mobile robot and the holding point at which the mobile robot holds the object.

When the above described equations (2) and (3) are used, a mobile robot can perform equivalent movements to that of a caster on the basis of a force acting upon the mobile robot in its translation orientation while keeping the mobile robot in its posture.

Moreover, each mobile robot is subjected to damping control by means of a moment ni acting upon a mobile robot as shown in an equation (4):

$$^{rot}D_i\dot{\theta}_i = n_i \qquad (4)$$

wherein $^{rot}D_i \in R$ represents a positive damping coefficient, and $\dot{\theta}_i \in R$ represents a real rotational speed in a mobile robot.

Thus, the mobile robot can be rotated on the basis of the moment acting upon the mobile robot.

Namely, motional characteristics in a mobile robot vary in accordance with control parameters $^{tran}D_i$, $r_i$, and $^{rot}D_i$, in the equations (2), (3), and (4) being characteristic parameters representing virtually characteristics of a caster.

An task for manipulating a single object performed by mobile robot and human being in cooperation with each other is classified into two categories of tasks, i.e., a positioning task and a conveying task by the present inventors as described above.

In the present embodiment, the tasks as described above are realized by selecting arbitrarily the control parameters $^{tran}D_i$, $r_i$, and $^{rot}D_i$.

Namely, when the control parameter $r_i$ in the equation (3) is changed in each mobile robot, characteristics of a caster action can be determined.

More specifically, when the parameter $r_i$ is allowed to decrease, a rotational speed in a caster coordinate system in the case when a certain force acts upon a mobile robot increases, so that it is possible to move the mobile robot as if damping control is omnidirectionally conducted.

On the other hand, when the control parameter $r_i$ is allowed to increase, a rotational speed in the caster coordinate system in the case when a certain force acts upon a mobile robot decreases, so that it is possible to reduce influences upon motion of the mobile robot produced by a force component $^c f_{yi}$ perpendicular to its travel orientation.

Accordingly, it may be arranged in such that when a speed of each mobile robot in its travel orientation:

$^c\dot{x}_i$ is low (slow), the control parameter $r_i$ is made to be small with such supposition that a mobile robot conducts a positioning task, while when the speed of each robot in its travel orientation:

$^c\dot{x}_i$ is high (fast), the control parameter $r_i$ is made to be large with such supposition that a mobile robot conducts a conveying task.

Furthermore, it is preferred that a damping coefficient $^{tran}D^i$ relating to a travel orientation in each mobile robot is made to be large to increase stability in the case when a speed of a mobile robot is low (slow) as in the case of positioning task, while it is made to be small in the case when a speed of a mobile robot is high (fast) as in the case of conveying task.

Moreover, it is preferred as to rotational direction that a damping coefficient $^{rot}D_i$ of rotation is made to be small so as to suitably move based on a moment in a positioning task wherein a speed of a mobile robot is low (slow), while the damping coefficient $^{rot}D_i$ is made to be large with such supposition that there is not required to rotate a mobile robot.

As described above, according to a method for controlling mobile robot of the present invention, control parameters are determined on the basis of a travel speed of a mobile robot: $^c\dot{x}_i$, whereby a cooperative manipulation for a single object by which a burden share of human being is reduced can be realized.

Experimental results of a system to which has been applied a method for controlling mobile robot according to the present invention will be described hereinafter.

Figure 3:
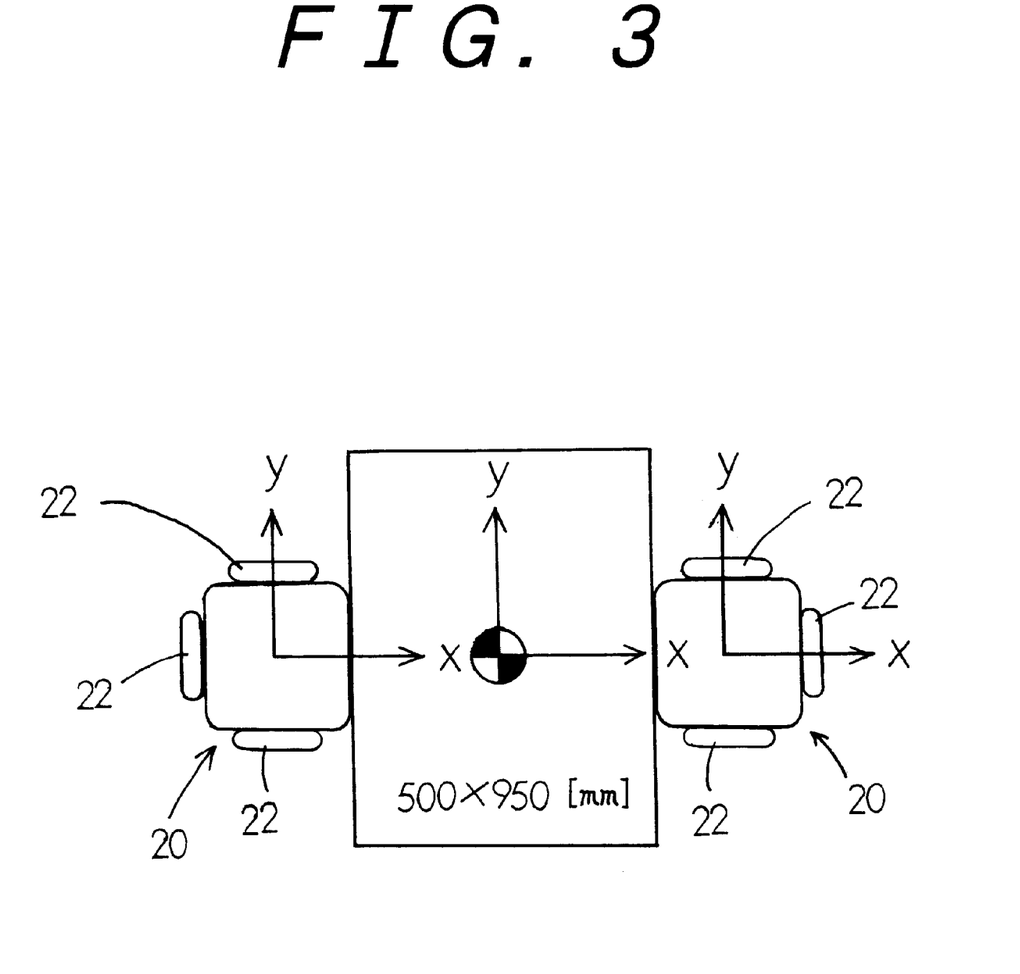
FIG. 3 is an explanatory view showing a system configuration used for experiments conducted by the present inventors.

Namely, two distributively controlled mobile robots 20 and 20 each loaded with a force sensing sensor and movable omnidirectionally were prepared as shown in FIG. 3, a software of a cooperative control algorithm for executing a method for controlling mobile robot according to the present invention was applied to a CPU (central processing unit) of a computer for controlling movements in the mobile robots 20 and 20, and an experiment in cooperative manipulation for a single object by a human being and robots was conducted.

In this case, the mobile robots 20 and 20 can be autonomously moved by the above described CPU control in any orientation.

Figure 4A:
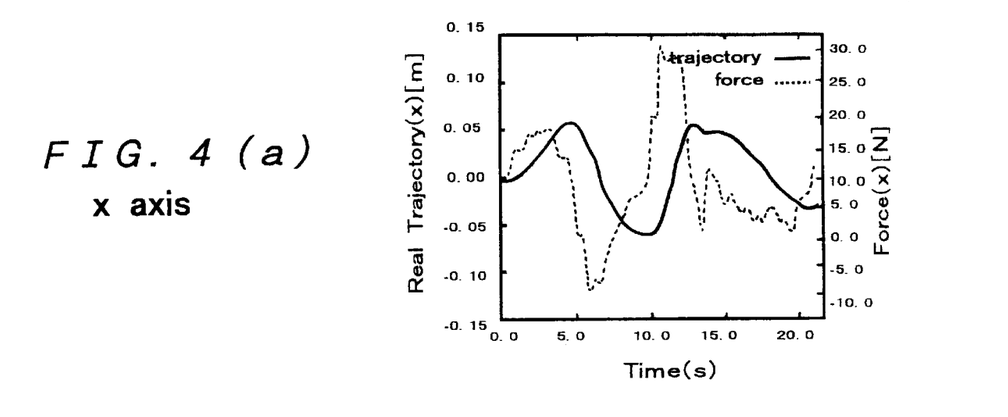
FIGS. 4(a), 4(b), and 4(c) are graphical representations each showing experimental results conducted by the present inventors wherein positioning tasks are carried out by the use of the system shown in FIG. 3, respectively.
Figure 4B:
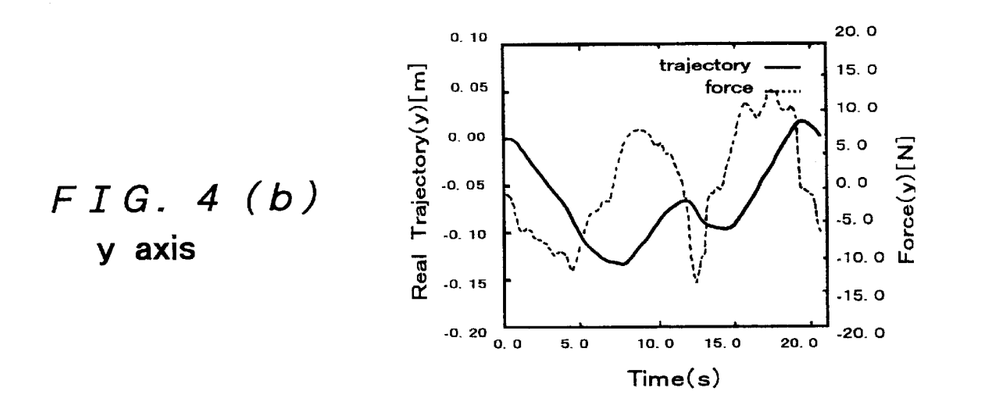
Figure 4C:
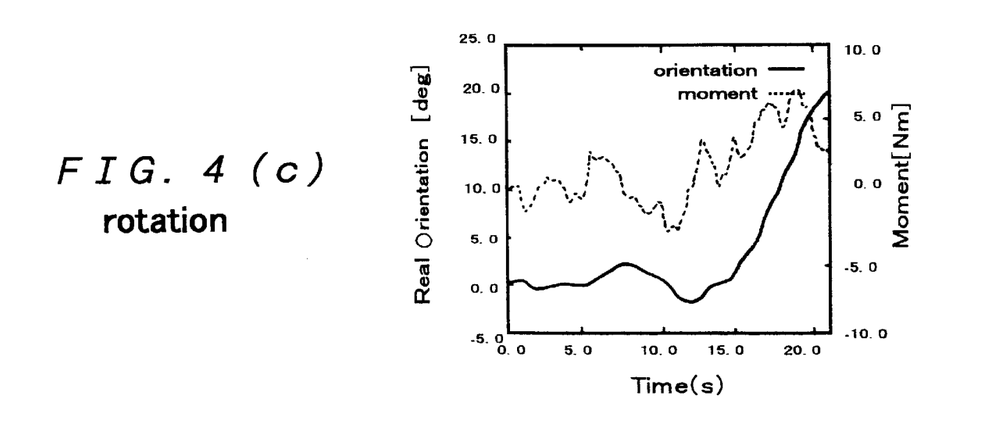
Figure 5A:
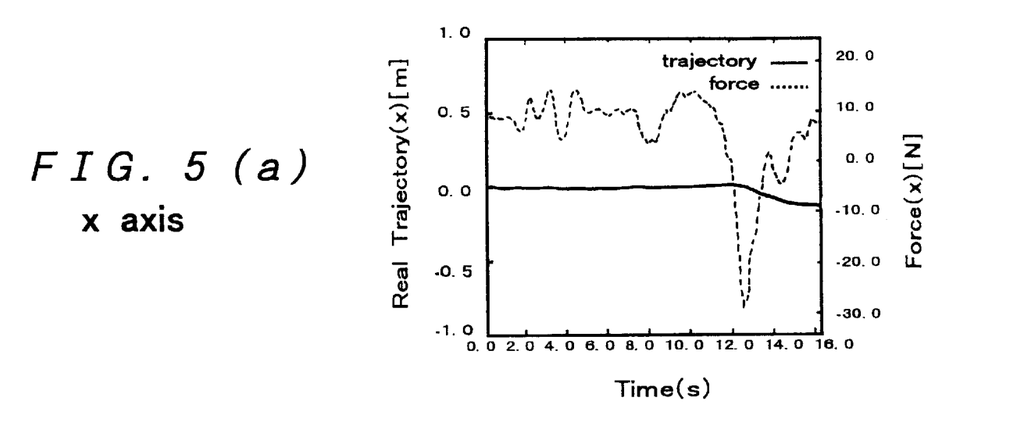
FIGS. 5(a), 5(b), and 5(c) are graphical representations each showing experimental results conducted by the present inventors wherein conveying tasks are carried out by the use of the system shown in FIG. 3.
Figure 5B:
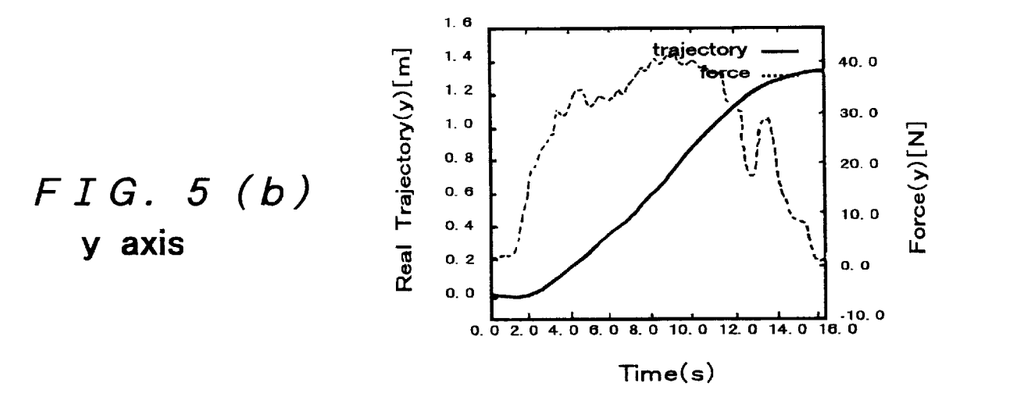
Figure 5C:
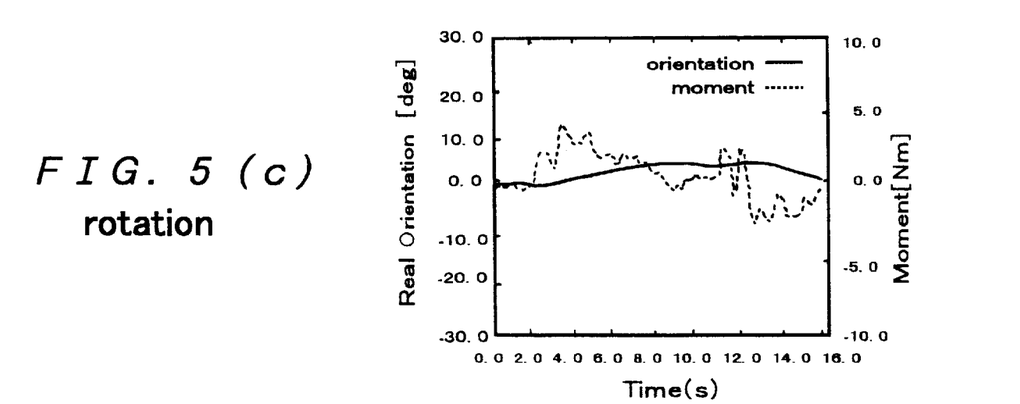

In this experiment, two tasks of a positioning task and a conveying task were carried out wherein results of the positioning task are shown in FIGS. 4(a), 4(b), and 4(c), while results of the conveying task are shown in FIGS. 5(a), 5(b), and 5(c).

The experimental results shown in FIGS. 4(a), 4(b), and 4(c) as well as FIGS. 5(a), 5(b), and 5(c) indicate real movements in the mobile robots 20 and 20 due to force/moment acted thereon.

Under the circumstances, it is recognized that the mobile robots 20 and 20 move based on a magnitude and an orientation in force/moment acting upon the mobile robots 20 and 20 in the experiment for a positioning task as shown in FIGS. 4(a), 4(b), and 4(c).

On one hand, the experiment for conveying task was conducted by applying a force in y-axial direction of the coordinate system shown in FIG. 3, and in this case, another force is intentionally applied in x-axial direction in the act of conveying task for the sake of exhibiting effectiveness in caster characteristics. The results in this occasion are shown in FIGS. 5(a), 5(b), and 5(c), respectively.

As is apparent from the graph shown in FIG. 5(a), each mobile robot 20 is scarcely affected by a force to perform favorably its conveyance in the y-axial direction as shown in FIG. 5(b) in spite of the fact that the force is applied in an orientation perpendicular to its travel orientation in the act of conveying tasks by the mobile robot.

It is to be noted that each mobile robot 20 holds an object by applying an internal force 10 [N] in the x-axial direction as shown in FIG. 4(a) and FIG. 5(a).

Since the present invention has been constituted as described above, the invention exhibits such an excellent advantage to provide a method for mobile robot motion control by which an object can be manipulated cooperatively by human being and mobile robot.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

The entire disclosure of Japanese Patent Application No. 2000-64209 filed on Mar. 8, 2000 including specification, claims, drawings and summary are incorporated herein by reference in its entirety.

What is claimed is:

1. A method for mobile robot motion control for the sake of controlling motional characteristics of the mobile robot, comprising:
the motional characteristics of the mobile robot being made to be virtually equivalent to motional characteristics of a caster, whereby motional performance adaptable to an external force is realized.

2. A method for mobile robot motion control for the sake of controlling motional characteristics of the mobile robot, comprising:
characteristic parameters of a caster being dynamically changed in control for mobile robot to which have been virtually applied equivalent motional characteristics of the caster, whereby motional characteristics of the mobile robot are appropriately changed.

3. A method for mobile robot motion control for the sake of controlling motional characteristics of the mobile robot, comprising:
a control parameter $r_i$, being made to be small in the case where a speed of a mobile robot in a travel orientation is low, while the control parameter $r_i$ being made to be large in the case where the speed of the mobile robot in the travel orientation is high; and the control parameter $r_i$ being an offset defined between a moving center of the mobile robot and a holding point at which the robot holds an object.

4. A method for mobile robot motion control for the sake of controlling motional characteristics of the mobile robot, comprising:
a control parameter $^{tran}D_i$ being made to be large in the case where a speed of a mobile robot in its travel orientation is low, while the control parameter $^{tran}D_i$ being made to be small in the case where the speed of the mobile robot in the travel orientation is high; and
the control parameter $^{tran}D_i$ corresponding to the origin of a robot coordinate system $'\Sigma_i$ fixed to a holding point of the mobile robot, at the same time, it being allowed to coincide a $^cx_i$-axis of a caster coordinate system $^c\Sigma_i$ rotatable freely around the origin with its travel orientation of the mobile robot, and it corresponding to a positive damping coefficient in the case where the mobile robot is subjected to damping control based on a force $^cf_{xi}$ acting in the $^cx_i$-axial direction.

5. A method for mobile robot motion control for the sake of controlling motional characteristics of the mobile robot, comprising:
a control parameter $^{rot}D_i$ being made to be small in the case where a speed of a mobile robot in a travel orientation is low, while the control parameter $^{rot}D_i$ being made to be large in the case where the speed of the mobile robot in the travel orientation is high; and
the control parameter $^{rot}D_i$ being a positive damping coefficient in the case where the mobile robot is subjected to damping control by a moment acting upon the mobile robot.

6. A method for mobile robot motion control for the sake of controlling motional characteristics of the mobile robot, comprising:
a control parameter $r_i$ being made to be small, a control parameter $^{trans}D_i$ being made to be large, and a control parameter $^{rot}D_i$ being made to be small in the case where a speed of a mobile robot in a travel orientation is low, while the control parameter $r_i$ being made to be large, a control parameter $^{trans}D_i$ being made to be small, and a control parameter $^{rot}D_i$ being made to be large in the case where the speed of the mobile robot in the travel orientation is high;
the control parameter $r_i$ being an offset defined between a moving center of the mobile robot and a holding point at which the robot holds an object;
the control parameter $^{trans}D_i$ corresponding to the origin of a robot coordinate system $'\Sigma_i$ fixed to a holding point of the mobile robot, at the same time, it being allowed to coincide a $^cx_i$-axis of a caster coordinate system $^c\Sigma_i$ rotatable freely around the origin with the travel orientation of the mobile robot, and it corresponding to a positive damping coefficient in the case where the mobile robot is subjected to damping control based on a force $^cf_{xi}$ acting in the $^cx_i$-axial direction; and
the control parameter $^{rot}D_i$ being a positive damping coefficient in the case where the mobile robot is subjected to damping control by a moment acting upon the mobile robot.

7. A computer-readable storage media comprising:
a program for executing a method for mobile robot motion control as claimed in any one of claims 1, 2, 3, 4, 5, and 6 by a computer being recorded therein.

8. A method for mobile robot motion control for the sake of controlling motional characteristics of the mobile robot, comprising:
making offset between a moving center of the mobile robot freely adjustable by software and a holding point at which the robot holds an object, whereby the motional characteristics of the mobile robot being made to be virtually equivalent to motional characteristics of a caster.

* * * * *